US006836454B2

United States Patent
Sasaki et al.

(10) Patent No.: US 6,836,454 B2
(45) Date of Patent: Dec. 28, 2004

(54) METHOD AND APPARATUS FOR READING AND WRITING INFORMATION ONTO AND FROM INFORMATION RECORDING DISKS

(75) Inventors: Manabu Sasaki, Hitachinaka (JP); Yasushi Fukuda, Odawara (JP); Kazuo Shigematsu, Yoshikawa (JP); Masahiko Takahashi, Yamanashi (JP)

(73) Assignee: Hitachi, Ltd., Tokyo (JP)

( * ) Notice: Subject to any disclaimer, the term of this patent is extended or adjusted under 35 U.S.C. 154(b) by 417 days.

(21) Appl. No.: 10/047,154

(22) Filed: Oct. 22, 2001

(65) Prior Publication Data

US 2002/0105872 A1 Aug. 8, 2002

Related U.S. Application Data

(63) Continuation-in-part of application No. 09/520,723, filed on Mar. 8, 2000, now Pat. No. 6,552,986.

(30) Foreign Application Priority Data

Oct. 23, 2000 (JP) ........................................ 2000-328399

(51) Int. Cl.[7] .............................................. G11B 7/00
(52) U.S. Cl. ................................ 369/47.39; 369/53.22; 369/53.37
(58) Field of Search .......................... 369/47.39, 53.22, 369/53.37, 53.3, 47.4, 47.41, 47.42, 47.45, 47.46, 53.2, 47.47

(56) References Cited

U.S. PATENT DOCUMENTS

| | | | | |
|---|---|---|---|---|
| 5,243,587 A | * | 9/1993 | Itoh et al. | ................. 369/47.11 |
| 5,394,387 A | * | 2/1995 | Watanabe | ................... 369/47.4 |
| 5,663,941 A | * | 9/1997 | Aoshima | ................. 369/44.34 |
| 5,673,242 A | * | 9/1997 | Lin | .......................... 369/53.37 |
| 6,414,924 B1 | * | 7/2002 | Jin | ............................ 369/53.2 |
| 6,538,967 B1 | * | 3/2003 | Lee | .......................... 369/47.46 |
| 6,600,708 B1 | * | 7/2003 | Kuo | .......................... 369/53.22 |
| 6,614,738 B1 | * | 9/2003 | Kim | .......................... 369/53.18 |
| 2002/0101807 A1 | * | 8/2002 | Kang | ...................... 369/53.19 |

FOREIGN PATENT DOCUMENTS

| | | |
|---|---|---|
| JP | 06-231467 | 8/1994 |
| JP | 09-017116 | 1/1997 |
| JP | 11-134772 | 5/1999 |

* cited by examiner

Primary Examiner—Hoa T. Nguyen
Assistant Examiner—Peter Vincent Agustin
(74) Attorney, Agent, or Firm—Townsend and Townsend and Crew LLP

(57) ABSTRACT

In an apparatus and method for information storage and retrieval, information is retrieved from the storage apparatus in a manner which includes varying an operational parameter of the storage apparatus according to a property of the information being retrieved. In the same apparatus and method, information is stored onto the storage apparatus in a manner which includes varying an operational parameter of the storage apparatus according to a property of the information to be stored. In this way, the energy consumption of the storage apparatus can be kept low.

26 Claims, 5 Drawing Sheets

IRD: Information Recording Disk
RSCM: Revolving Speed Control Means

RSCM: Revolving Speed Control Means
IRD: Information Recording Disk

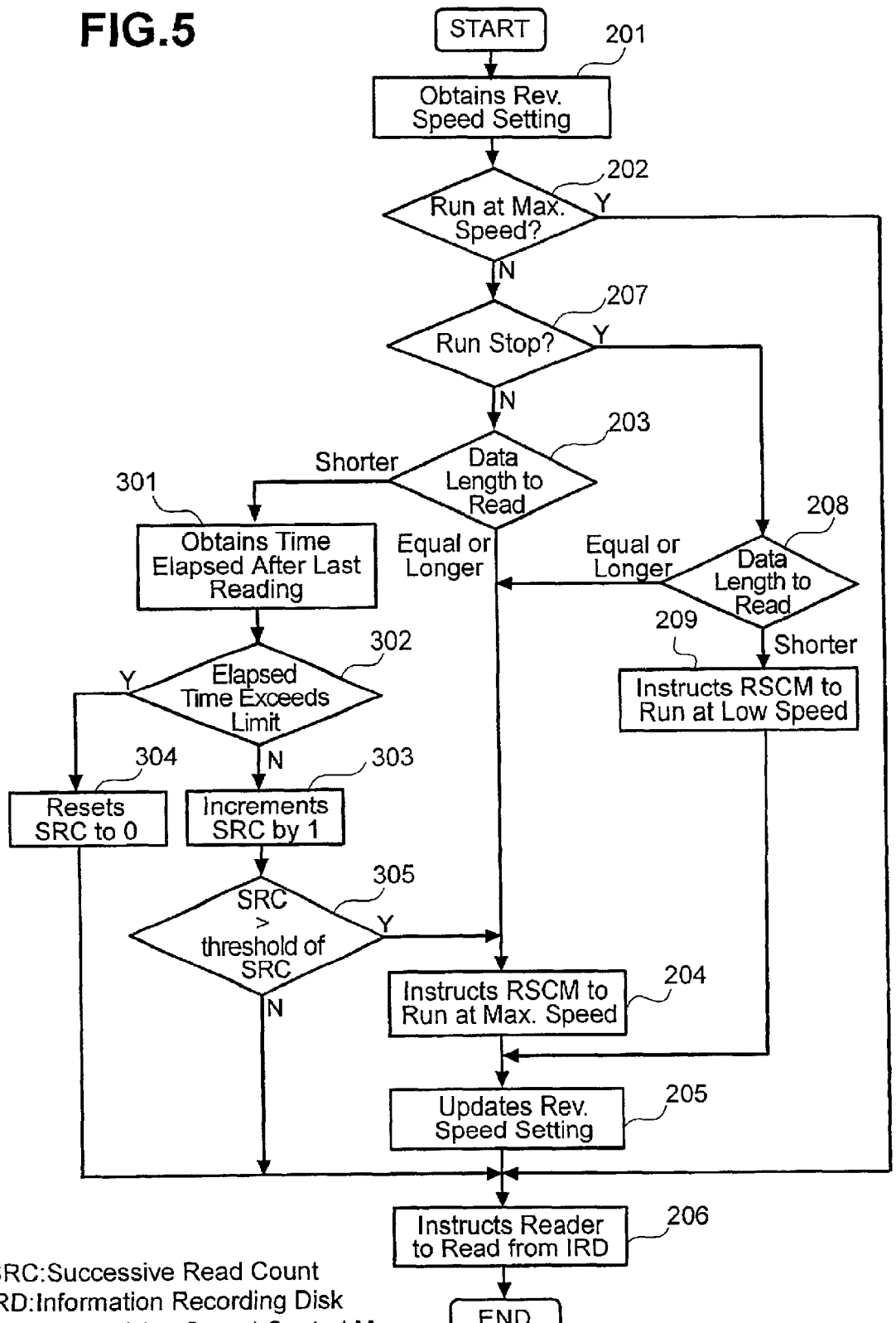

METHOD AND APPARATUS FOR READING AND WRITING INFORMATION ONTO AND FROM INFORMATION RECORDING DISKS

CROSS-REFERENCES TO RELATED APPLICATIONS

This application is a continuation-in-part application of U.S. application Ser. No. 09/520,723, filed Mar. 8, 2000 now U.S. Pat. No. 6,552,986, entitled "Apparatus for Recording and Reproducing Data," which is herein incorporated by reference for all purposes.

This application is related to and claims priority from Japanese Patent Application No. 2000-328399, filed on Oct. 23, 2000.

BACKGROUND OF THE INVENTION

The present invention relates to devices for reading information from information recording disks or devices for writing information onto such disks: e.g., optical disk drives such as CD-ROM drives, CD-R/RW drives, DVD-ROM drives, DVD-RAM drives, DVD-R/RW drives, etc., magneto-optic disk drives such as MO drives, MD drives, etc., and magnetic disk drives such as hard disk drives or the like.

When a CD-ROM drive or the like operates for reproduction, it reads information from a disk mounted on it, while making the disk revolving at the maximum speed (maximum revolutions per second), in order to read necessary information as quickly as possible from the disk. If the disk drive remains inoperative for reading from the disk for a preset period, it sets the disk revolving at low speed. If the disk drive still remains inoperative for reading for a further longer preset period, it stops the disk. By controlling the disk revolution in this way, low power consumption and noise reduction designed for CD-ROM drives or the like are achieved. By way of example, a typical CD-ROM drive structure is represented in a block diagram shown in FIG. 1.

A host computer (the principal unit using the CD-ROM drive) 101 commands the CD-ROM drive (the device for reproducing information from information recording disks) 102 to read information from an information recording disk 103 mounted on it. Directive information required for reading, which comprises, for example, an on-the-disk location in which object data to be retrieved is recorded and length of the object data, can be known from control information. The control information includes, for example, information recorded beginning from 0 minutes, 2 seconds, and 16 frames on the disk in the case of CD-ROMs complying with ISO 9660 and TOC information in the case of CD-DA. Even for other types of disks, the location where object data is recorded and data length can be known from the control information equivalent to the above examples.

From the host computer 101, upon receiving the command to read information, a microprocessor 104 activates a program for information reading from the information recording disk, the program stored in a ROM 105. A specific procedure of the program-controlled microprocessor operation is as follows. If the information recording disk 103 revolves at low speed or stops, the microprocessor 104 instructs a revolving speed control means 107 to spin the disk at the maximum speed and a reader from information recording disk 108 to read information from the information recording disk 103. At this time, the revolving speed setting that the revolving speed control means 107 received as the instruction from the microprocessor is stored into a RAM 110. The revolving speed control means 107 comprises a spindle motor for spinning the information recording disk 103 and a control circuit for controlling the speed of the spindle motor.

When instructed to read, the reader from information recording disk 108 which is a means for reading object data starts reading the data from the information recording disk 103, no matter what speed at which the disk revolves. The reader from information recording disk 108 comprises an optical pickup for reproducing information from the information recording disk 103. The optical pickup is comprised of a semiconductor laser, optical components, a focus actuator, a tracking actuator, a light-sensitive detector, and other elements. Light emitted from the semiconductor laser converges on a focal point, thus making a light spot on the signal recording surface of the information recording disk 103. Because the quantity of light reflected from the light spot changes, depending on whether a pit exists on the disk surface, signal reproduction can be accomplished by detecting the changes in light quantity as signals.

The microprocessor 104 instructs a decoder 109 to decode the information read by the reader from information recording disk 108 into form in which the information can be transferred to the host computer 101. The decoder 109 executes decoding the read information, using a buffer 106. The microprocessor 104 also instructs the decoder 109 to transfer the information decoded by the decoder 109 (such as, e.g., information causing an interruption and a value contained in a register) to the host computer 101. The decoder 109, thus instructed, transfers the decoded information to the host computer 101.

If the microprocessor 104 remains not receiving a command to read information from the host computer 101 for a preset period, it instructs the revolving speed control means 107 to spin the disk at low speed. If the microprocessor 104 still remains not receiving a command to read information for a further longer preset period, it instructs the revolving speed control means 107 to stop the disk. Each time the disk revolving speed changes, the revolving speed setting recorded in the RAM 110 is updated. Next time the microprocessor is commanded to read information from the host computer 101, it instructs the revolving speed control means 107 to spin the disk at the maximum speed.

In the above-described CD-ROM drive or the like in accordance with prior art, the revolving speed control means 107 for reading information from the information recording disk 103 is instructed to spin the disk at full speed only as commanded to read information from the host processor 101. Whenever a read command is issued from the host computer 101, the revolving speed control means 107 is always instructed to spin the disk at the maximum speed. This results in consuming power more than required and generating unnecessary noise and vibration. Attention should be paid to address this drawback for data to be read or written from/onto a CD-ROM or any other randomly accessible disk, or for portable, mobile equipment such as notebook-size personal computers for which requirement of reduced power consumption is important.

While the foregoing description discussed the case where information is read from the information recording disk 103, in view of the disk revolving speed, the same problem arises when information is recorded onto the disk 103 as is the case for reading information from the disk.

SUMMARY OF THE INVENTION

In accordance with the present invention a device and method for transferring information with an information storage device includes operating the information storage device at one of a number of rotational speeds. Size information pertaining to the amount of data involved in the transfer is received and based on the received size information, the rotational speed of the information storage device is operated accordingly.

BRIEF DESCRIPTION OF THE DRAWINGS

These and other embodiments of the present invention are described in more detail in conjunction with the text below and the following figures:

FIG. 5 is a flowchart illustrating the procedure of controlling the disk revolving speed, depending on the successive read count based on a predetermined interval between reading events, in the preferred embodiment of the invention.

DETAILED DESCRIPTION OF THE INVENTION

Figure 1:
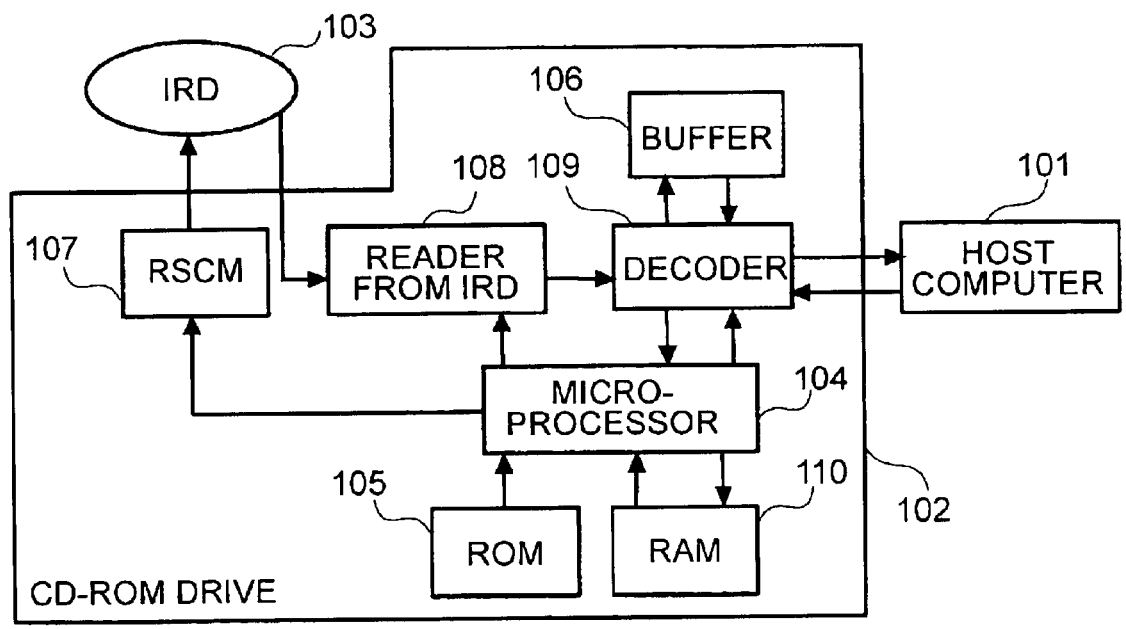
FIG. 1 is a block diagram of a typical CD-ROM drive to which a preferred embodiment of the present invention is applied.

Below is a brief discussion of the various illustrative embodiments of the invention. This is followed by sufficiently detailed enabling descriptions.

To solve the foregoing problems, the present invention as embodied and broadly described herein includes a revolving speed control means for controlling the revolving speed of the information recording disk mounted on the disk drive, according to the length of object data to read from the disk. In accordance with an illustrative embodiment of the present invention, a device for reproducing from an information recording disk is provided, comprising a read means for reading information from the information recording disk mounted on the device by a read command issued from a principal unit using the device, a microprocessor that sets the disk revolving at suitable speed by referring to the length of object data to read which is obtained by making the read means retrieve it from control information included in information recorded on the disk, and a revolving speed control means for spinning the disk at the set suitable speed for reproducing information from the disk. The device of the constitution described above can achieve reduced power consumption and reduced noise and vibration.

When data is written onto the disk, the revolving speed control means included in the present invention controls the disk revolving speed, according to the length of object data to write onto the disk. According to this aspect of the invention, a device for recording information onto an information recording disk is provided comprising a writing means for writing information onto the information recording disk mounted on the device by a write command issued from a principal unit using the device, a microprocessor that sets the disk revolving at suitable speed by referring to the length of data to write which is to be written onto the disk by the writing means, and a revolving speed control means for spinning the disk at the set suitable speed for recording information onto the disk. The device of the constitution described above can achieve reduced power consumption and reduced noise and vibration.

The above-mentioned "length of data to read" means the length of data to read that can be retrieved from the control information that has been recorded onto the disk by the principal unit using the device. In accordance with the invention, the drive includes a data read size parameter which relates to the largest amount of data that can be transferred in one read operation. If the length of data to read, retrieved from the control information, is equal to or shorter than the data read size parameter, then the data is retrieved in one read operation. However, if the length of data to read, retrieved from the control information, is longer than the data read size parameter, the read operation is divided into two or more data transfers. The multiple data transfers can be achieved in one of two ways: either the principal unit issues multiple read requests, each requesting an amount of data equal to the date read size parameter, or the principal unit issues a single read request and the drive responds with multiple data transfers (each of size equal to the data read size parameter, with the last transfer possibly being smaller) to the principal unit, where each transfer involves an amount of data equal to the data read size parameter.

The present application is a continuation-in-part application of co-pending U.S. application Ser. No. 09/520,723, filed Mar. 8, 2000, entitled "Apparatus for Recording and Reproducing Data," which is herein incorporated by reference for all purposes.

With reference to the appended drawings, an illustrative embodiment of the present invention will now be described. The present invention commonly applies to disk drives which are configured in the same structure as for prior-art disk drives. The manner in which the microprocessor 104 works is unique in the present invention. Thus, the structure and components of a typical CD-ROM drive as a preferred embodiment of the present invention will be understood to be the same as explained with reference to FIG. 1. The following explanation focuses on the manner in which the microprocessor 104 works. In the following, the control of disk revolving speed as the disk drive reads information from the disk mounted on it will be explained. Because the point is controlling the disk revolving speed, even when the disk drive records information onto the disk, the disk revolving speed can be controlled in the same manner as for reading information.

Figure 2:
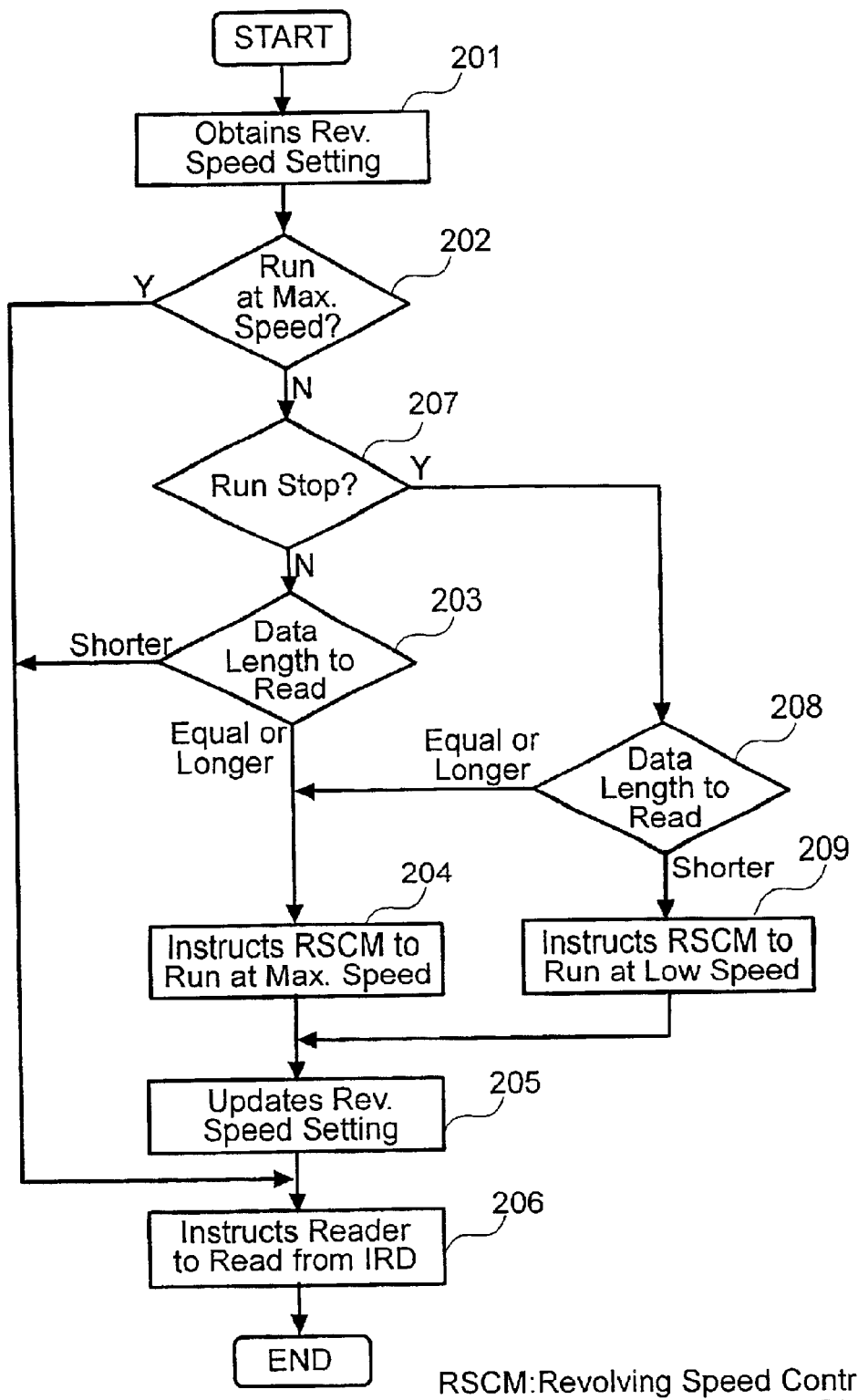
FIG. 2 is a flowchart illustrating the procedure of controlling the disk revolving speed in the preferred embodiment of the invention.

FIG. 2 is a flowchart illustrating an aspect of the invention showing the procedure of controlling the disk revolving speed, as information is read from the information recording disk, which is carried out by the program-controlled microprocessor in the preferred embodiment of the present invention.

Refer to FIG. 2. In step 201, from the RAM 110, the microprocessor obtains the revolving speed setting of the information recording disk, set by the revolving speed control means 107 for reproduction from the disk. In step 202, the microprocessor determines whether the disk spins at the maximum speed according to the revolving speed setting obtained in the step 201. If the disk spins at the maximum speed, the microprocessor goes to step 206 and keeps the disk spinning at the maximum speed. If the disk does not spin at the maximum speed, the microprocessor goes to step 207 and determines whether the disk has stopped. If the disk has stopped, the microprocessor goes to step 208. In the step 208, the microprocessor refers to the length of object data to read, which has been requested by the host computer 101 and makes the following determination. If the length of object data to read is shorter than a predetermined threshold, the microprocessor goes to step 209. The microprocessor 104 determines to set the disk revolving at low speed and instructs the revolving speed control means 107 to spin the disk at low speed, and then goes to step 205. If the length of object data to read is equal to or longer than the predetermined threshold, the microprocessor goes to step 204.

It is noted that the present invention further contemplates the possibility of using multiple thresholds to provide for more multiple speed settings. Thus, if the data to be read is less than or equal to a first predetermined threshold (T1), then the disk is operated at a lowest speed setting (S1). If the data to be read is greater than the first predetermined threshold but less than or equal to a second predetermined threshold (T2), the disk is operated at a second to lowest speed setting (S2). If the data to be read is greater than the second predetermined threshold but less than or equal to a third predetermined threshold (T3), the disk is operated at a third to lowest speed setting (S3). This can be extended for additional speed settings as appropriate. Similar processing can be provided for write operations.

If the judgment in the step 207 is that the disk has not stopped, the microprocessor goes to step 203 in which it refers to the length of object data to read, requested by the host computer 101, and makes the following judgment. If the length of object data to read is shorter than a predetermined threshold, the microprocessor goes to step 206 and keeps the disk spinning at the currently set speed without giving instructions to the revolving speed control means 107. If the length of object data to read is equal to or longer than the predetermined threshold, the microprocessor goes to step 204.

In the step 204, the microprocessor 104 determines to set the disk revolving at the maximum speed (i.e., a maximum steady state operating speed) and instructs the revolving speed control means 107 to spin the disk at the maximum speed. Hereon, increasing the disk revolving speed can be controlled in a plurality of steps up to the maximum speed. In some situation, it may be sufficient to set the disk revolving speed higher than the low speed at which the disk is set to revolve when the length of object data to read is shorter than the predetermined threshold: it is not always required to accelerate the disk revolving speed up to the maximum.

In the step 205, the microprocessor updates the revolving speed setting recorded in the RAM 110 to the current revolving speed of the disk.

In the step 206, the microprocessor instructs the reader from information recording disk 108 to read the object data from the information recording disk 103.

As described above, the length of the object data to read can be obtained from the control information existing on the information recording disk 103. Necessary control information may be read from the information recording disk 103 each time the host computer 101 issues a command to read data from the disk 103 to the disk drive. Alternatively, control information in a block may be read and memorized prior to reading object data so as to be referenced each time reproduction is performed.

Figure 3:
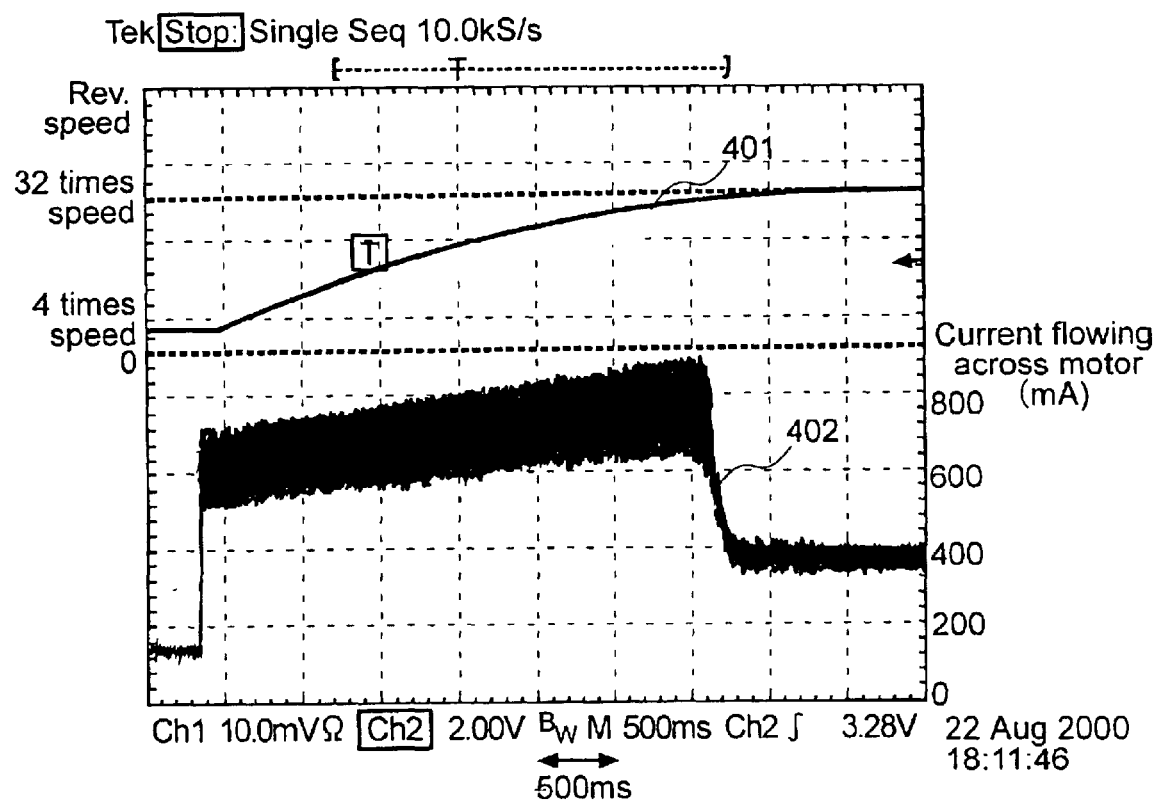
FIG. 3 is a graphic representation of the disk revolving speed versus the current flowing across the motor as information is read from the disk, according to prior art.
Figure 4:
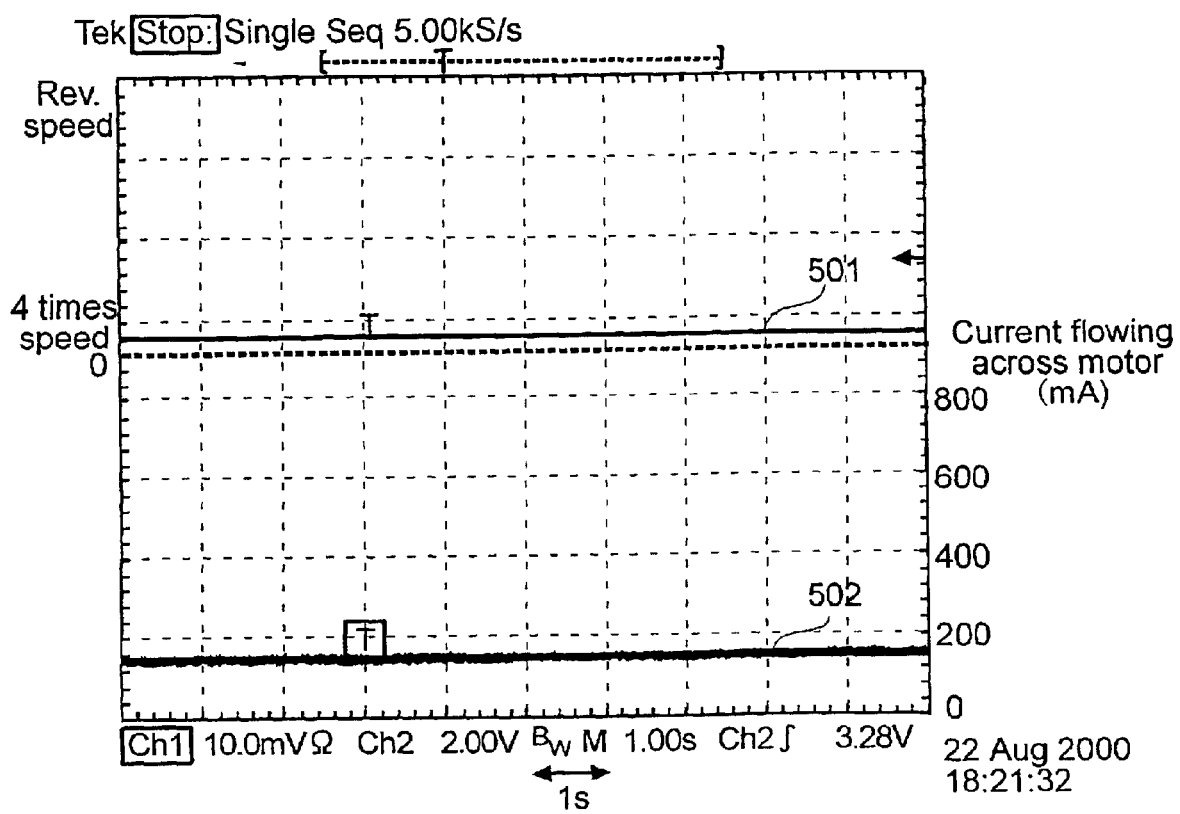
FIG. 4 is a graphic representation of the disk revolving speed versus the current flowing across the motor as information is read from the disk, according to the present invention.

Next, refer to FIGS. 3 and 4 where the relation between the revolving speed of the disk and the current flowing across the motor is shown.

FIG. 3 is a graphic representation of the revolving speed of the information recording disk versus the current flowing across the motor as information is read from the disk, according to prior art. The disk revolving speed and the motor revolving speed are plotted on the axis of ordinate and time on the axis of abscissa. FIG. 3 represents the characteristics of the motor of the prior-art disk drive wherein the disk revolving speed is maximized, regardless of the length of object data to read from the disk. Waveform 401 represents the transition of the disk revolving speed over time from the state of the disk revolving at low speed (4-times speed) at the left end of the waveform 401 to the state of the disk revolving at the maximum speed (32-times speed) at the right end. Waveform 402 represents the transition of the current flowing across the motor over time. It is apparent that power consumption is wasteful when accelerating the motor revolutions because the current required for accelerating the motor revolutions is significantly greater than the current required to spin the disk at the maximum speed. Although the low revolving speed is set at 4-times speed and the maximum revolving speed is set at 32-times speed in this illustrative case, such wasteful power consumption also appears for other speed settings; e.g., 2-times speed as the low revolving speed and 16-times speed as the maximum revolving speed.

FIG. 4 is a graphic representation of the revolving speed of the information recording disk versus the current flowing across the motor as information is read from the disk, according to the preferred embodiment of the present invention. The disk revolving speed and the motor revolving speed are plotted on the axis of ordinate and time on the axis of abscissa as is the case in FIG. 3. FIG. 4 represents the characteristics of the motor of the disk drive to which the present invention is applied, wherein the revolving speed of the information recording disk does not change (without acceleration up to the maximum speed) as the length of object data to read from the disk is shorter than the threshold. Waveform 501 represents the transition of the disk revolving speed over time and indicates that the disk is revolving at constant low speed. Waveform 502 represents the transition of the current flowing across the motor over time. It is apparent that only the current required for spinning the disk at low speed is flowing across the motor and reduced power consumption is achieved.

FIG. 5 is a flowchart illustrating the procedure of controlling the disk revolving speed, depending on the successive read count based on a predetermined interval between reading events from the CD-ROM drive or the like, as information is read from the information recording disk, which is carried out by the program-controlled microprocessor in the preferred embodiment of the present invention. It is noted that the aspect of the invention about to be described can be practiced in conjunction with other disclosed aspects of the invention, or can be practiced absent the other disclosed aspects of the invention.

Refer to FIG. 5. In step 201, from the RAM 110, the microprocessor obtains the revolving speed setting of the information recording disk, set by the revolving speed control means 107 for reproduction from the disk In step 202, according to the revolving speed setting obtained in the step 201, the microprocessor makes the following judgment. If the disk spins at the maximum speed, the microprocessor goes to step 206 and keeps the disk spinning at the maximum speed. If the disk does not spin at the maximum speed, the microprocessor goes to step 207 and determines whether the disk stops. If the disk stops, the microprocessor goes to step 208. In the step 208, the microprocessor refers to the length of object data to read, requested by the host computer 101, and makes the following determination. If the length of object data to read is shorter than a predetermined threshold, the microprocessor goes to step 209. The microprocessor 104 determines to set the disk revolving at low speed and instructs the revolving speed control means 107 to spin the disk at low speed, and then goes to step 205. If the length of object data to read is equal to or longer than the predetermined threshold, the microprocessor goes to step 204.

If the judgment in the step 207 is that the disk does not stop, the microprocessor goes to step 203 in which it refers to the length of object data to read, requested by the host computer 101, and makes the following judgment. If the length of object data to read is shorter than a predetermined threshold, the microprocessor goes to step 301. If the length of object data to read is equal to or longer than the predetermined threshold, the microprocessor goes to step 204.

In the step 301, the microprocessor obtains a value of time elapsed after the last data reading from the information recording disk 103 in order to determine if a "successive data reading event" has occurred. A successive data reading event is defined according to the present invention as a read event which occurs within a certain time from the last read event. By thus obtaining the elapsed time, the microprocessor 104 monitors an interval between data reading events, and thus determines whether a read event is a successive data reading event. In step 302, if the elapsed time obtained in the step 301 exceeds a predetermined time, then the microprocessor determines that the data reading event is not a successive data reading event and goes to step 304. The microprocessor resets a successive read count to 0. The successive read count serves the purpose of keeping track of the number of successive data reading events from the information recording disk.

If the elapsed time obtained in the step 301 falls within the predetermined time, then the microprocessor determines that the new data reading event is a successive data reading event and goes to step 303. The microprocessor increments the successive read count by one. In step 305, the microprocessor determines whether the incremented successive read count is greater than a threshold of the successive read count. If the successive read count is greater than the threshold thereof, the microprocessor goes to step 204. If the successive read count is less than or equal to the threshold thereof, the microprocessor goes to step 206.

In the step 204, recall that the microprocessor 104 determines to set the disk revolving at high speed or the maximum speed and instructs the revolving speed control means 107 to spin the disk at high speed or the maximum speed. In the step 205, the microprocessor updates the revolving speed setting recorded in the RAM 110 to the current revolving speed of the disk. In the step 206, the microprocessor instructs the reader from information recording disk 108 to read the object data from the information recording disk 103.

As can be seen in FIG. 5, the disk revolving speed is also controlled, depending on the successive read count, so that quicker data reading will be performed by changing the revolving speed from low to high or maximum speed if the successive read count is more than a predetermined number of times of successive reading events even if the length of object data to read is less than the predetermined length. The term, successive read means that a data reading event caused by a read command issued from the host computer takes place within the predetermined interval from the last data reading event. In accordance with the invention, "successive read" is not restricted to continuous data reading from the information recording disk.

As described above, by applying the present invention, the revolutions of the information recording disk mounted on the disk drive is controlled, depending on the length of object data to read from the disk. Consequently, the present invention can accomplish reduced power consumption and reduced noise and vibration of the disk drive.

While the foregoing description discussed data reading from the information recording disk 103, the present invention is also applicable to data recording (writing) onto the disk 103 as noted above. For data writing, a write command instead of a read command is issued from the principal unit using the disk drive. A writing means for writing information onto the disk is activated instead of the read means. The device for recording information onto information recording disks replaces the device for reproducing information from information recording disks. An interval between data writing events onto the disk replaces the interval between data reading events. A successive write count instead of the successive read count is used. By carrying out the same control procedures shown in FIGS. 2 and 5 for recording as for reproducing information, the invention can also accomplish reduced power consumption and reduced noise and vibration of the disk drive when recording is performed.

In accordance with the invention, the disk drive includes a data write size parameter which relates to the largest amount of data that can be transferred in one write operation. If the length of data to write is equal to or shorter than the data write size parameter, then the data is written in one write operation. However, if the length of data to write is longer than the data write size parameter, the write operation is divided into two or more write operations by the principal unit.

According to the present invention, as described above, the revolving speed of the information recording disk mounted on the disk drive is controlled, depending on the length of object data to read from the disk or the length of data to write onto the disk. Consequently, the present invention can achieve reduced power consumption and reduced noise and vibration of the disk drive.

What is claimed is:

1. An apparatus for reproducing information from a storage medium comprising:

a motor unit operable to rotate said storage medium at any one of a plurality of rotational speeds; and a data control unit operatively coupled to said motor unit and operable with said storage medium for accessing information contained on said storage medium;

said data control unit configured to receive size-indicating information relating to an amount of data to be reproduced, said data control unit configured to receive a request for a read operation and, in response to said request, to control said motor unit to rotate said storage medium at one of said rotational speeds depending on said size-indicating information, said data control unit being further configured for data transfer operations wherein each data transfer operation includes an amount of data equal to a maximum data size, and in response to a read request for an amount of data greater than said maximum data size, said data control unit being operable to transfer said amount of data in two or more data transfer operations, each data transfer operation of a data size less than or equal to said maximum data size.

2. The apparatus of claim 1 wherein said data control unit is further configured to control said motor unit to operate at a first rotational speed if said size-indicating information indicates a data size that is less than a predetermined value and to operate at a second rotational speed if said size-indicating information indicates a data size that is greater than or equal to said predetermined value, said first rotational speed being less than said second rotational speed.

3. The apparatus of claim 2 wherein said second rotational speed is a maximum rotational speed.

4. The apparatus of claim 1 wherein said data control unit is further configured to control said motor unit to operate at a first rotational speed if said size-indicating information indicates a data size that is less than or equal to a first predetermined value and to operate at a second rotational speed if said size-indicating information indicates a data size that is greater than said first predetermined value and less than or equal to a second predetermined value, said first rotational speed being less than said second rotational speed, said second rotational speed being less than a maximum rotational speed.

5. The apparatus of claim 1 wherein said data control unit is further configured to detect a number of successive read operations wherein each read operation occurs within a predetermined period of time of a preceding read operation, and to operate said motor unit at a rotational speed based on the number of said successive read operations detected.

6. The apparatus of claim 5 wherein said data control unit is further configured to operate said motor unit at a maximum rotational speed if a predetermined number of successive read operations is detected.

7. The apparatus of claim 1 wherein said data control unit is further configured to:
    access said storage medium to receive said size-indicating information;
    to transmit said size-indicating information to a principal unit; and
    to receive said size-indicating information from said principal unit in connection with said request for a read operation.

8. The apparatus of claim 7 wherein said data control unit is further configured for data transfer operations wherein each data transfer operation includes an amount of data equal to a maximum data size, wherein said data control unit is further configured to receive from said principal unit a plurality of two or more requests for a read operation when information to be reproduced from said storage medium is greater than said maximum data size, each of said requests being for an amount of a data less than or equal to said maximum data size.

9. An apparatus for reproducing information from a storage medium comprising:
    a motor unit operable to rotate a storage medium at any one of a plurality of rotational speeds; and
    a data control unit operatively coupled to said motor unit and operable with said storage medium for reproducing information from said storage medium,
    said data control unit configured to detect a number of successive read operations wherein each read operation occurs within a predetermined period of time of a preceding read operation, and to rotate said storage medium at a rotational speed based on the number of said successive read operations,
    said data control unit being configured for data transfer operations wherein each data transfer operation includes an amount of data equal to a maximum data size, and in response to a read operation for an amount of data greater than said maximum data size, said data control unit being operable to transfer said amount of data in two or more data transfer operations, each data transfer operation of a data size less than or equal to said maximum data size.

10. The apparatus of claim 9 wherein said data control unit is further configured to control said motor unit at a maximum rotational speed if a predetermined number of successive read operations is detected.

11. The apparatus of claim 9 wherein said data control unit is further configured to access size-indicating information stored on said storage medium relating to an amount of data to be reproduced and to transmit said size-indicating information to a principal unit, said data control unit being further configured to receive said size-indicating information from said principal unit in connection with a request for a read operation and to rotate said storage medium at a rotational speed based on said size-indicating information.

12. The apparatus of claim 11 wherein said data control unit is further configured to control said motor unit to operate at a first rotational speed if said size-indicating information indicates a data size that is less than a predetermined value and to operate at a second rotational speed greater than said first rotational speed if said size-indicating information indicates a data size that is greater than or equal to said predetermined value.

13. The apparatus of claim 11 wherein said data control unit is further configured to control said motor unit to operate at a first rotational speed if said size-indicating information indicates a data size that is less than or equal to a first predetermined value and to operate at a second rotational speed if said size-indicating information indicates a data size that is greater than said first predetermined value and less than or equal to a second predetermined value, said first rotational speed being less than said second rotational speed, said second rotational speed being less than a maximum rotational speed.

14. A method for reproducing information from a rotatable storage medium comprising:
    receiving a read operation request;
    receiving size-indicating information relating to an amount of data to be reproduced from said rotatable storage medium;
    rotating said rotatable storage medium at one of a number of predetermined rotation speeds based on said size-indicating information;
    reproducing said data from said rotatable storage medium; and
    in response to receiving a read operation request for an amount of data greater than said maximum data size, transferring reproduced data in two or more data transfer operations, each data transfer operation of a data size less than or equal to said maximum data size.

15. The method of claim 14 further including rotating said rotatable storage medium at a first rotational speed if said size-indicating information indicates a data size that is less than a predetermined value and rotating said rotatable storage medium at a second rotational speed if said size-indicating information indicates a data size that is greater than or equal to said predetermined value, said first rotational speed being less than said second rotational speed.

16. The method of claim 14 further including rotating said rotatable storage medium at a first rotational speed if said size-indicating information indicates a data size that is less than or equal to a first predetermined value and further including rotating said rotatable storage medium at a second rotational speed if said size-indicating information indicates a data size that is greater than said first predetermined value and less than or equal to a second predetermined value, said first rotational speed being less than said second rotational speed, said second rotational speed being less than a maximum rotational speed.

17. The method of claim 14 further including detecting a number of successive read operations, wherein each read operation occurs within a predetermined period of time of a preceding one of said read operations, and rotating said rotatable storage medium at a rotational speed based on the number of said successive read operations detected.

18. The method of claim 17 further including rotating said rotatable storage medium at a maximum rotational speed if a predetermined number of successive read operations is detected.

19. The method of claim 14 further including obtaining said size-indicating information from said rotatable storage medium and transferring it to a principal unit, receiving said read operation request from said principal unit, said read operation request including said size-indicating information.

20. The method of claim 19 further including transferring reproduced data to a principal unit wherein a data transfer operation is performed with a maximum data size, the method further including receiving a plurality of two or more read operation requests in order to transfer an amount of reproduced data exceeding said maximum data size, each of said read operations being of a data size less than or equal to said maximum data size.

21. An apparatus for exchanging information with a storage medium comprising:
 a motor unit operable to rotate said storage medium at any one of a plurality of rotational speeds; and
 a data control unit operatively coupled to said motor unit and operable with said storage medium for reading information from and writing information to said storage medium,
 said data control unit configured to receive size-indicating information relating to an amount of data associated with an I/O (input, output) request,
 said data control unit configured to receive an I/O request and, in response thereto, to control said motor unit to rotate said storage medium at one of said rotational speeds depending on size-indicating information associated with said I/O request,
 wherein said data control unit is further configured to control said motor unit to operate at a first rotational speed if said size-indicating information indicates a data size that is less than or equal to a first predetermined value and to operate at a second rotational speed if said size-indicating information indicates a data size that is greater than said first predetermined value and less than or equal to a second predetermined value, said first rotational speed being less than said second rotational speed, said second rotational speed being less than a maximum rotational speed.

22. An apparatus for exchanging information with a storage medium comprising:
 a motor unit operable to rotate said storage medium at any one of a plurality of rotational speeds; and
 a data control unit operatively coupled to said motor unit and operable with said storage medium for reading information from and writing information to said storage medium,
 said data control unit configured to receive size-indicating information relating to an amount of data associated with an I/O (input, output) request,
 said data control unit configured to receive an I/O request and, in response thereto, to control said motor unit to rotate said storage medium at one of said rotational speeds depending on size-indicating information associated with said I/O request,
 said data control unit being further configured for data transfer operations wherein each data transfer operation includes an amount of data equal to a maximum data size, and in response to a read request for an amount of data greater than said maximum data size,
 said data control unit being operable to transfer said amount of data in two or more data transfer operations, each data transfer operation of a data size less than or equal to said maximum data size.

23. An apparatus for a storage medium comprising:
 a motor unit operable to rotate a storage medium at any one of a plurality of rotational speeds; and
 a data control unit operatively coupled to said motor unit and operable with said storage medium for exchanging information with said storage medium,
 said data control unit configured to detect a number of successive I/O (input, output) operations of a first kind wherein each I/O operation occurs within a predetermined period of time of a preceding one of said I/O operations, and in response to such detection to rotate said storage medium at a rotational speed based on the number of said successive I/O operations,
 said data control unit being further configured to access size-indicating information associated with an amount of data to be exchanged and to transmit said size-indicating information to a principal unit,
 said data control unit being further configured to control said motor unit to operate at a first rotational speed if said size-indicating information indicates a data size that is less than or equal to a first predetermined value and to operate at a second rotational speed if said size-indicating information indicates a data size that is greater than said first predetermined value and less than or equal to a second predetermined value, said first rotational speed being less than said second rotational speed, said second rotational speed being less than a maximum rotational speed.

24. An apparatus for a storage medium comprising:
 a motor unit operable to rotate a storage medium at any one of a plurality of rotational speeds; and
 a data control unit operatively coupled to said motor unit and operable with said storage medium for exchanging information with said storage medium,
 said data control unit configured to detect a number of successive I/O (input, output) operations of a first kind wherein each I/O operation occurs within a predetermined period of time of a preceding one of said I/O operations, and in response to such detection to rotate said storage medium at a rotational speed based on the number of said successive I/O operations,
 said data control unit being configured for data transfer operations wherein each data transfer operation includes an amount of data equal to a maximum data size, and in response to an I/O operation for an amount of data greater than said maximum data size, said data control unit being operable to transfer said amount of data in two or more data transfer operations, each data transfer operation of a data size less than or equal to said maximum data size.

25. A method for performing I/O (input/output) operations with a rotatable storage medium comprising:

receiving an I/O request;

receiving size-indicating information relating to an amount of data to be transferred with said rotatable storage medium by said I/O request;

rotating said rotatable storage medium at one of a number of predetermined rotation speeds based on said size-indicating information; and performing said I/O request to effect a transfer of said data with said rotatable storage medium, wherein said rotating includes rotating said rotatable storage medium at a first rotational speed if said size-indicating information indicates a data size that is less than or equal to a first predetermined value and further including rotating said rotatable storage medium at a second rotational speed if said size-indicating information indicates a data size that is greater than said first predetermined value and less than or equal to a second predetermined value, said first rotational speed being less than said second rotational speed, said second rotational speed being less than a maximum rotational speed.

26. A method for performing I/O (input/output) operations with a rotatable storage medium comprising:

receiving an I/O request;

receiving size-indicating information relating to an amount of data to be transferred with said rotatable storage medium by said I/O request;

rotating said rotatable storage medium at one of a number of predetermined rotation speeds based on said size-indicating information; and performing said I/O request to effect a transfer of said data with said rotatable storage medium, wherein if said size-indicating information is greater than said maximum data size, then performing said I/O request in two or more data transfer operations, each data transfer operation of a data size less than or equal to said maximum data size.

* * * * *